United States Patent [19]
Maitani et al.

[11] 4,272,168
[45] Jun. 9, 1981

[54] PHOTOGRAPHIC CAMERA OF AUTOMATIC EXPOSURE CONTROL TYPE

[75] Inventors: Yoshihisa Maitani; Katsuhiko Tsunefuji, both of Hachioji, Japan

[73] Assignee: Olympus Optical Co., Ltd., Tokyo, Japan

[21] Appl. No.: 59,078

[22] Filed: Jul. 19, 1979

[30] Foreign Application Priority Data

Sep. 8, 1978 [JP] Japan .................................. 53/110383
Sep. 8, 1978 [JP] Japan .................................. 53/110384

[51] Int. Cl.³ ...................... G03B 7/083; G03B 17/04; G03B 17/38
[52] U.S. Cl. .................................... 354/51; 354/187; 354/217; 354/234; 354/268
[58] Field of Search .................. 354/48, 50, 51, 217, 354/218, 234, 235, 258, 266–268, 288, 187, 158

[56] References Cited

U.S. PATENT DOCUMENTS

| | | | |
|---|---|---|---|
| 3,256,793 | 6/1966 | Denk et al. | 354/288 |
| 3,599,553 | 8/1971 | Hansen et al. | 354/288 |
| 3,643,567 | 2/1972 | Douglas | 354/268 X |
| 3,680,455 | 8/1972 | Meinunger | 354/187 |
| 3,732,795 | 5/1973 | Fukuda | 354/288 |
| 3,878,546 | 4/1975 | Adamski | 354/217 X |
| 4,096,506 | 6/1978 | Lange | 354/288 |
| 4,132,471 | 1/1979 | Suatek | 354/187 |
| 4,171,894 | 10/1979 | Yamada | 354/288 X |

*Primary Examiner*—L. T. Hix
*Assistant Examiner*—William B. Perkey
*Attorney, Agent, or Firm*—Weinstein & Sutton

[57] ABSTRACT

A photographic camera of an automatic exposure control type has an electrical shutter of electromagnetic release type and also has a front cover slidably disposed across the front surface of a camera body between a first position in which it closes a taking lens and a second position in which it exposes the taking lens. The camera comprises a first, a second and a third switch which are mechanically associated with the front cover, a rear lid of camera and a film winding mechanism of camera, respectively. The second switch may be replaced by a switch which is mechanically associated with a film frame counter. These switches are connected in an electrical shutter circuit in a manner such that a shutter release operation is disabled in the first position of the front cover, but is enabled in the first position of the front cover whenever the rear lid is opened, thus enabling a film loading operation.

22 Claims, 15 Drawing Figures

PHOTOGRAPHIC CAMERA OF AUTOMATIC EXPOSURE CONTROL TYPE

BACKGROUND OF THE INVENTION

The invention relates to a photographic camera of automatic exposure control type, and more particularly, to such camera having an electrical shutter of an electromagnetic release type which is provided with a front cover movable between a first position in which it covers a taking lens and a second position in which it permits the taking lens to be exposed.

As is well recognized, a taking lens in a usual camera is coverd by a lens cap to protect it from the deposition of dusts or fingerprints thereon or its abrasion except when the camera is used to take a picture. However, a lens cap is easily lost. The present applicant has previously proposed a photographic camera of automatic exposure control type which is provided with a slidable front cover capable of covering at least the taking lens when the camera is not in use (see U.S. Ser. No. 969,776 and German patent application P2901491.3).

Before proceeding with the description of the present invention, a photographic camera of automatic exposure control type having such a front cover will be described with reference to FIGS. 1 to 3. In these Figures, there is shown camera 1 which has body 5 of a rectangular configuration having its top and bottom closed by upper and lower panels 6, 7. Body 5 includes front wall 5a, the central portion 5c of which is raised higher than the remainder and receives taking lens 2 therein. On the upper, left-hand side thereof, the front wall is formed with window 18 for passing input light onto light receiving element CdS (see FIG. 5) which is provided for purpose of photometry. Body 5 includes top wall 5b which is also centrally raised and in which finder objective lens 3 and eyepiece (not shown) are disposed.

Front cover 4 is formed of a sheet material which is folded to define front plate 4a, top plate 4b and rear plate (invisible in FIGS. 1 to 3) which extend along the front, the top and the rear surface of body 5 inclusive of front wall 5a and the central raised portion of top wall 5b. In its lower end, front plate 4a is formed with guide slot 8 which is elongate in the lengthwise direction of body 5. Guide pin 9 which is fixedly mounted on the lower end of front wall 5a is fitted into guide slot 8, thereby allowing cover 4 to be moved between a first position shown in FIG. 1 in which it covers the taking lens to disable a photographing operation and a second position shown in FIG. 2 in which it is displaced to the right to expose taking lens 2, thus enabling a photographing operation. In the example shown, cover 4 has a lateral width which prevents its projection beyond the extremity of camera 1 in its second position. Disposed in top wall 5b is stop member 17 which is adapted to move upwardly for abutment against the inner end face of cover 4 when the latter is displaced to its second position and which is engageable with a slot, not shown, formed in the inner surface of top plate 4b to prevent an unintended movement of cover 4.

Film rewind knob 10 is disposed in upper panel 6 toward its right-hand end, while shutter release button 11, sight window 13a associated with film frame counter 13 and index 14 are disposed thereon toward the left-hand end thereof. Film winding knob 12 is disposed on the rear side of body 5 toward the left-hand end thereof. In addition, synchro contact socket 15 is disposed in the left-hand portion of front wall 5a for permitting a flashlight photographing operation. The camera also includes rear lid 16 which is hinged on the left-hand sidewall of body 5 for pivotal movement.

FIG. 4 shows an electrical shutter mechanism of an electromagnetic release type which may be incorporated into the camera described above. Referring to FIG. 4, there is shown disc-shaped shutter drive member 21 which is fixedly mounted on single rotatable shaft 22. Prime mover spring 23 disposed on shaft 22 has its one end 23a anchored to drive member 21 and its other end fixedly 23b connected with charging member 29 which is driven for rotation in response to a film winding operation. In this manner, prime mover spring 23 is charged as a film is being wound, thus urging shutter drive member 21 to rotate in the counter-clockwise direction. However, before the shutter is operated, the resulting rotation of drive member 21 is prevented by the abutment of arm 21a radially extending from drive member 21 against bevelled edge 25a of member 25 which is pivotally mounted at 24 and which defines a start position for the rotation of drive member 21. Thus, drive member 21 is maintained at rest at the start position.

Bevelled edge 25a is formed on one end of member 25 while its other end 25b is held attracted to shutter release electromagnet Mg1, which comprises a release electromagnet of a known form including a permanent magnet. Member 25 is normally urged by spring 30 to rotate clockwise about pivot 24, whereby end 25b is held attracted by electromagnet Mg1 while bevelled edge 25a is engaged by arm 21a to maintain shutter drive member 21 at rest at its start position.

Located on the path of rotation of arm 21a is controller 26a which is formed by one arm of detent member 26 which is effective to determine an exposure period. Detent member 26 is pivotally mounted at 27, and is urged by spring 28 to rotate counter-clockwise about pivot pin 27. As a consequence, armature 26b formed on the other end thereof moves into abutment against shutter controlling electromagnet Mg2 and is held attracted thereto during the operation of the shutter.

Drive pin 31 is fixedly mounted on the upper end face of shutter drive member 21 adjacent to the periphery thereof, and fits in elongate slot 32b formed in horizontally extending portion 32a which is formed at the lower end of connecting rod 32. Rod 32 is pivotally mounted on pin 33, and fixedly carries shutter blade drive pin 34 on is upper end which fits in elongate slots 37a, 38a formed in one end of both shutter blades 37, 38. Both shutter blades 37, 38 have their one end pivotally mounted on pins 35, 36, and are shown in their position closing taking light path 39 in FIG. 4. Shutter blades 37, 38 constitute together a so-called vario type shutter, and operate to open or close light path 39 when shutter drive member 21 is driven by the resilience of prime mover spring 23 to rock connecting rod 32 about its pin 33 through drive pin 31.

The described shutter mechanism is automatically controlled by an electrical shutter circuit which is shown in FIG. 5. In FIG. 5, power source E has its positive terminal connected with positive bus E1 and its negative terminal connected with negative bus E2. A series circuit including release switch SW1, which is interlocked with release button 11, capacitor C1 and resistors R2, R3 is connected across the pair of buses as is another series circuit including disconnection switch SW2, which is interlocked with a film winding mechanism to disconnect the shutter circuit from the power supply when the film winding operation is completed, resistor R4, and starting transistor Tr1 of NPN type. Also connected across the pair of buses E1 and E2 are a series circuit of PNP transistor Tr3, which is effective to maintain the circuit connected with the power supply, and resistor R5, a further series circuit including resistor R6 and NPN trigger transistor Tr4, still another series circuit including resistor R9, electromagnet Mg1 and capacitor C2, and an additional series circuit including electromagnet Mg2, shunted by counter e.m.f conducting capacitor C4, and NPN switching transistor Tr7.

Resistor R1 having an increased resistance is connected between the junction between release switch SW1 and capacitor C1 and bus E2 for causing a discharge of capacitor C1. Transistor Tr1 has its base connected with the junction between resistors R2 and R3, its emitter connected with bus E2 and its collector connected with resistor R4. NPN transistor Tr2 is connected in shunt with transistor Tr1, and has its collector connected with the collector of transistor Tr1, its emitter connected with bus E2 and its base connected with the collector of transistor Tr3. The base of transistor Tr3 is connected with the junction between resistor R4 and switch SW2, and its emitter is connected with bus E1, while its collector is connected with resistor R5.

Transistor Tr4 has its base connected with the collector of transistor Tr3, its emitter connected with bus E2, and its collector connected with one end of resistor R6, which has its other end connected with bus E1. The junction between resistor R6 and the collector of transistor Tr4 is connected with another bus E3. Connected across buses E1 and E3 are a photometric control circuit and a drive circuit for electromagnet Mg1, both of which form the heart of the electrical shutter circuit. Thus, transistor Tr4 effectively operates as a power switch and a trigger switch for the photometric control circuit.

The drive circuit for electromagnet Mg1 comprises a series circuit including PNP transistor Tr5 and resistor R8 connected across buses E1 and E3, and NPN transistor Tr6 which is connected in shunt with the series combination of electromagnet Mg1 and capacitor C2. Specifically, transistor Tr5 has its base connected with bus E3 through resistor R7, its emitter connected with bus E1, and its collector connection with bus E3 through resistor R8. Transistor Tr6 has its base connected with the collector of transistor Tr5, its emitter connected with bus E2 and its collector connected with bus E1 through resistor R9. Capacitor C2 is normally charged from power supply E through resistor R9 and electromagnet Mg1, and is caused to discharge rapidly through electromagnet Mg1 and transistor Tr6 as transistor Tr4 is turned on to cause a conduction of transistors Tr5 and Tr6, thus counteracting or cancelling the force of attraction applied by a permanent magnet contained in the release electromagnet which forms the electromagnet Mg1.

The photometric control circuit comprises a series circuit of photometric, light receiving element CdS which is disposed adjacent to window 18 mentioned above, and timing capacitor C3, and another series circuit connected in shunt with element CdS and including flash photography switch SW7 and timing resistor R13 which is utilized to determine an exposure period during a flash photography. These series circuits form a time constant circuit which determines an exposure period and which is connected across buses E1, E3. In addition, the control circuit includes a voltage divider formed by a series combination of variable resistor VR1 and resistor R10, and comparator CP, all connected across the pair of buses E1 and E3.

Light receiving element CdS is adapted to receive reflective light from an object being photographed which passes through window 18, and is adapted to exhibit a resistance which varies in accordance with the brightness level of the reflective light, thus establishing the resistance of time constant circuit. The junction between element CdS and capacitor C3 is connected with one input of comparator CP. Switch SW7 is turned on as the shutter is operated when an electronic flash is connected with synchro circuit 15. When it is turned on, resistor R13 is connected in parallel with element CdS to permit the shutter to be closed at an earlier timing than that determined by the combination of element CdS and capacitor C3 alone. Usually, this earlier timing is chosen to be on the order of 1/30 to 1/60 second.

The junction between variable resistor VR1 and resistor R10 is connected with the other input of comparator CP to determine the level at which comparator CP operates to reverse its output. Comparator CP operates to supply an output voltage to the base of switching transistor Tr7 through resistor R11 whenever transistor Tr4 is turned on. Consequently, transistor Tr7 is turned on to operate the shutter. When capacitor C3 in the time constant circuit is charged to a given level, comparator CP operates to reverse its output voltage, whereby an output voltage ceases to be applied to the base of transistor Tr7, thus turning it off.

The operation of the described electrical shutter will now be described with reference to FIGS. 4 and 5. FIG. 4 shows the shutter when it is charged after a film winding operation. Since prime mover spring 23 is charged, it urges shutter drive member 21 to rotate counterclockwise. However, member 25 which is constrained by shutter release electromagnet Mg1 has its bevelled edge 25a located in the path of rotation of arm 21a to block a movement thereof, so that shutter drive member 21 remains at rest at the start position.

To take a picture, the front cover 4 shown in FIG. 2 is moved to its open position and shutter button 11 is depressed. In response thereto, release switch SW1 is closed. Then, in the electrical circuit shown in FIG. 5, differentiated pulse is produced by capacitor C1 and is applied to the base of starting transistor Tr1, which is then turned on. This causes transistor Tr3 to be turned on also, whereby both transistors Tr2 and Tr4 are also turned on. When shutter button 11 is released subsequently to open switch SW1 to thereby turn transistor Tr1 off, transistor Tr3 maintains its conductive condition, so that transistors Tr2 and Tr4 remain on, thus maintaining the connection of the shutter circuit with the power supply.

When transistor Tr4 conducts, bus E3 is fed from power supply E, so that transistors Tr5 and Tr6 are immediately turned on. Comparator CP produces an output voltage which is applied to the base of transistor Tr7 to turn it on, whereby electromagnet Mg2 is energized. When transistor Tr6 conducts, capacitor C2 momentarily discharges through shutter release electromagnet Mg1, thus counteracting the force of attraction thereof. In response to such demagnetization, arm 25b of member 25 is freed, whereby the resilience of spring 23 which acts on arm 21a causes member 25 to rotate counter-clockwise about its pivot pin 24, thus moving bevelled edge 25a out of engagement with arm 21a to permit a counter-clockwise rotation of shutter drive member 21 under the resilience of spring 23, thus starting the shutter to run.

As shutter drive member 21 begins to rotate counter-clockwise, its integral drive pin 31 rocks connecting rod 32 clockwise, whereby shutter blades 37, 38 being to open in accordance with the displacement of connecting rod 32 until taking light path 39 is fully opened at a position where arm 21a is blocked by controller 26a on detent member 26.

The photometric control circuit begins to operate at the same time as the electromagnet Mg1 is energized by a discharge current from capacitor C2. The control circuit operates by integrating the amount of reflective light from an object being photographed by the time constant circuit comprising capacitor C3 and element CdS, with a voltage representing the integral applied to one input of comparator CP. In this manner, the time constant of this circuit, which controls the time required for capacitor C3 to be charged to a given level, determines a proper exposure period as is well recognized.

When an electronic flash is connected with the synchro socket 15, switch SW7 is turned on as the shutter is operated, so that a parallel combination of resistor R13 and element CdS is connected with capacitor C3 to provide an exposure period on the order of 1/30 to 1/60 second as mentioned previously.

As capacitor C3 is charged and reaches a voltage level which is equal to that at the junction between resistors VR1 and R10, comparator CP operates by interrupting its output voltage, whereby electromagnet Mg2 is deenergized to cause the shutter to be closed. When electromagnet Mg2 is deenergized, armature piece 26b on detent member 26 is no longer constrained, and thus the resilience of prime mover spring 23 is effective to cause arm 21a to drive controller 26a out of the path of rotation thereof, thus permitting a further counter-clockwise rotation of shutter drive member 21 until the start position shown in FIG. 4 is reached to complete one revolution. Thereupon arm 21a turns disconnection switch SW2 on, thus turning transistors Tr2 to Tr6 off. The permanent magnet contained in the electromagnet Mg1 attracts the other end 25b of member 25, whereby bevelled edge 25a is returned to its initial position, thus abutting against arm 21a to stop the rotation of drive member 21. After disengagement of arm 21a from controller 26a, shutter blades 37, 38 rotate counter-clockwise to close taking light path 39, which is completely closed at the stop position of drive member 21.

When a picture is taken by an automatic exposure process accomplished by the electrical shutter, a film winding operation takes place, which charges prime mover spring 23 in preparation to taking another picture.

The above description covers the operation of a camera having front cover 4 and an electrical shutter of electromagnet release type which has been previously proposed by the present applicant.

In a camera of automatic exposure control type and having a front cover which is capable of being opened and closed, it is desirable to prevent an unintended shutter release during the portable use thereof in order to prevent a wasteful photographing operation and power dissipation. This can be achieved by disabling a shutter release operation when the front cover is closed. It is also advantageous to prevent the rear lid from being opened inadvertently when the front cover is in its open position.

However, when the described camera is provided means which achieves such objectives, an inconvenience is caused during a film loading operation. Specifically, the rear lid must be opened to permit a film loading. This requires that the front cover be moved to its closed position, but this disables a shutter release operation. Because the shutter release operation is disabled, the shutter cannot be operated, preventing a film winding mechanism from operating. Hence a leader portion of the film cannot be wrapped around a film take-up spool.

To remove the described difficulty, an arrangement must be made to permit a shutter operation when the front cover is closed and the rear lid of the camera is opened. However, under this condition, because the front cover is closed, no light impinges upon the light receiving element, so that an exposure period of an increased length would result. Hence, there is a need to permit a shutter operation with a reduced exposure period under the condition mentioned above.

SUMMARY OF THE INVENTION

It is an object of the invention to provide a camera of an automatic exposure control type and having an electrical shutter of electromagnetic release type in which a high speed shutter operation is automatically enabled at the same time as the completion of a film winding operation during a film loading when the front cover is closed and the rear lid is opened while disabling a shutter release operation when the front cover is closed and the rear lid is closed.

It is another object of the invention to provide a camera of the type described in the preceding paragraph in which the completion of a film winding operation automatically enables a high speed shutter operation until a film frame counter presents a count of "1" when the front cover is closed while disabling a shutter release operation after a count of "1" is set in the film frame counter.

It is a further object of the invention to provide a camera of the type described in which a shutter release operation is disabled when the front cover is closed, but is enabled during a film loading condition when the rear lid is opened, with the shutter operation taking place at a high speed corresponding to an exposure period during a flash photography or with an exposure period of a specified reduced length.

It is an additional object of the invention to provide a camera of the type described in which a shutter release operation is enabled in conjunction with a film frame counter during a film loading condition when the front cover is closed and the rear lid is opened, with a shutter operation taking place at a high speed corresponding to an exposure period during a flash photography or with an exposure period of a specified reduced length.

In accordance with the invention, there is provided a camera of an automatic exposure control type and having an electrical shutter which comprises a first switch associated with a front cover of the camera, a second switch associated with a rear lid of the camera, and a third switch associated with a film winding mechanism of the camera, these switches being connected in an electrical shutter circuit in a manner such that a shutter release operation is disabled when the front cover assumes a position to close a taking lens, but a high speed shutter operation is automatically enabled in response to the completion of a film winding operation whenever the rear lid of the camera is opened even though the front cover is closed, thus eliminating the described difficulty of the prior art.

In another aspect of the invention, there is provided a camera of an automatic exposure control type comprising a first switch associated with a front cover, a second switch associated with a film frame counter, and a third switch associated with a film winding mechanism, all of the switches being connected in an electrical shutter circuit in a manner such that a shutter release operation is disabled when the front cover closes a taking lens to disable a photographing operation, but a high speed shutter operation is automatically enabled in response to the completion of a film winding operation until a count of "1" appears in the film frame counter if the front cover is positioned to disable a photographing operation. In this manner, a film loading can be quickly made.

In a further aspect of the invention, there is provided a camera of an automatic exposure control type comprising a first switch associated with a front cover and a second switch associated with a rear lid, both of which are connected in an electrical shutter circuit in a manner such that a shutter release operation is disabled when the front cover closes a taking lens to disable a photographing operation, but a shutter operation is enabled during a film loading operation with an exposure period corresponding to a flash photography or with a specified exposure period, thus allowing a rapid film loading under the condition that the front cover closes the taking lens.

In an additional aspect of the invention, there is provided a camera of an automatic exposure control type comprising a first switch associated with a front cover and a second switch associated with a film frame counter, both of which are connected in an electrical shutter circuit in a manner such that a shutter release operation is disabled when the front cover closes a taking lens to disable a photographing operation, but a shutter operation is enabled during a film loading operation with an exposure period corresponding to a flash photography or with a specified exposure period.

DESCRIPTION OF PREFERRED EMBODIMENTS

Figure 1:
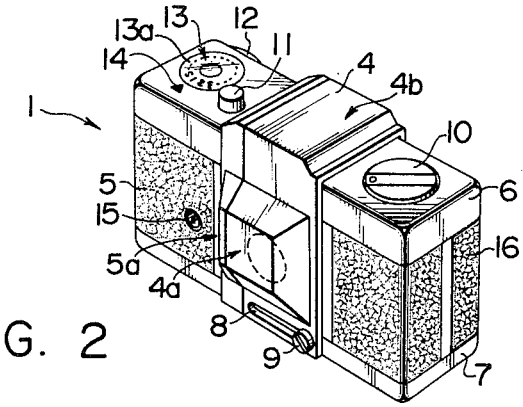
FIG. 1 is a perspective view of a camera of an automatic exposure control type to which the invention may be applied, with its front cover being in its closed position.

A camera of an automatic exposure control type which is constructed in accordance with the invention has an appearance and an electrical shutter mechanism both of which are substantially identical with a conventional arrangement shown in FIGS. 1 to 4, and therefore their description will not be repeated again. Referring to FIG. 6, there is shown an electrical shutter circuit of the camera which is constructed in accordance with the invention and which is similar in many respects to the conventional shutter circuit shown in FIG. 5 except certain modifications which will be described below. In other respects, the arrangement will be readily understood from above description of FIG. 5 inasmuch as corresponding parts are designated by like reference characters.

In FIG. 6, in accordance with the invention, there are provided a first, a second and a third switch SW3, SW4 and SW5 which are mechanically associated with front cover 4, rear lid 16 and film winding mechanism (not shown), respectively. As shown in FIG. 6, switch SW5 which is associated with a film winding mechanism is connected so as to be a substitute for disconnection switch SW2 shown in FIG. 5. It comprises movable contact terminal SW5c, a pair of fixed terminals SW5a, SW5b and movable contact SW5d. Terminal SW5a is connected with the base of transistor Tr3 while terminal SW5b is connected with the base of transistor Tr6 through a series combination of switch SW4, mechanically associated with the rear lid, and resistor R12. Terminal SW5c is connected with bus E1. Switch SW5 is mechanically associated with a film winding mechanism such that contact SW5d is thrown to terminal SW5b upon completion of a film winding operation, and is thrown to terminal SW5a upon completion of running of the shutter. Switch SW4 which is mechanically associated with the rear lid is closed when rear lid 16 is opened, and is opened when lid 16 is closed. Switch SW3 is connected between bus E1 and the base of transistor Tr3, and is opened when the front cover 4 is opened and closed when the latter is closed.

The operation of the camera according to the invention will now be described. As mentioned previously, in the camera of the invention, when front cover 4 is in its open position to enable a photographing operation, top plate 4b of front cover 4 overlies film rewind knob 10, which therefore cannot be pulled up to unlock rear lid 16, thus preventing the latter from being opened. Consequently, a film loading requires that the front cover be moved to its closed position to disable a photographing operation so that rewind knob 10 can be pulled up manually in order to open rear lid 16. When cover 4 is closed, switch SW3 associated therewith is closed, whereby the base of transistor Tr3 is connected with positive bus E1, thus preventing this transistor from being turned on. Subsequently when rear lid 16 is opened, switch SW4 is closed. If a film winding mechanism has completed its winding operation at this time, movable contact SW5d is thrown to fixed terminal SW5b, whereby the base of transistor Tr6 is connected with bus E1 through bias resistor R12, and switches SW4, SW5. This transistor is then turned on, whereupon capacitor C2 produces a pulse-like discharge current flow through shutter release electromagnet Mg1, thus counteracting the force of attraction of a permanent magnet contained therein. As a consequence, member 25 (see FIG. 4) which has been constrained by the electromagnet Mg1 becomes free to rock, thus effecting a shutter release as in the conventional arrangement.

Since transistor Tr3 is prevented from becoming conductive, transistor Tr4 which operates as a power switch cannot be turned on. Consequently, no operating voltage is supplied to comparator CP, and hence transistor Tr7 remains off, maintaining shutter controlling electromagnet Mg2 deenergized. This means that detent member 26 (see FIG. 4) which determines an exposure period is subject to no constraint, so that when arm 21a on shutter drive member 21 has angularly moved to the position of controller 26a (see FIG. 4) on detent member 26 after a shutter release, controller 26a has no blocking action upon arm 21a. Thus, shutter drive member 21 goes through one revolution in an uninterrupted manner. Consequently, shutter will operate automatically at its maximum speed.

If the film winding mechanism has not completed its winding operation when rear lid 16 is opened, film winding knob 12 (see FIG. 3) may be operated to complete a film winding operation. Simultaneously with the completion of a film winding operation, movable contact SW5d of switch SW5 switches from fixed terminal SW5a to terminal SW5b, thus achieving a shutter operation at its maximum speed in the same manner as occurring when the film winding mechanism has completed its winding operation when rear lid 16 is opened.

When both front cover 4 and rear lid 16 are closed, the closure of SW3 prevents transistor Tr3 from being turned on. At this time, switch SW4 is opened, so that transistor Tr6 cannot be turned on. As a consequence, electromagnet Mg1 cannot be deenergized, preventing a shutter release operation.

Figure 5:
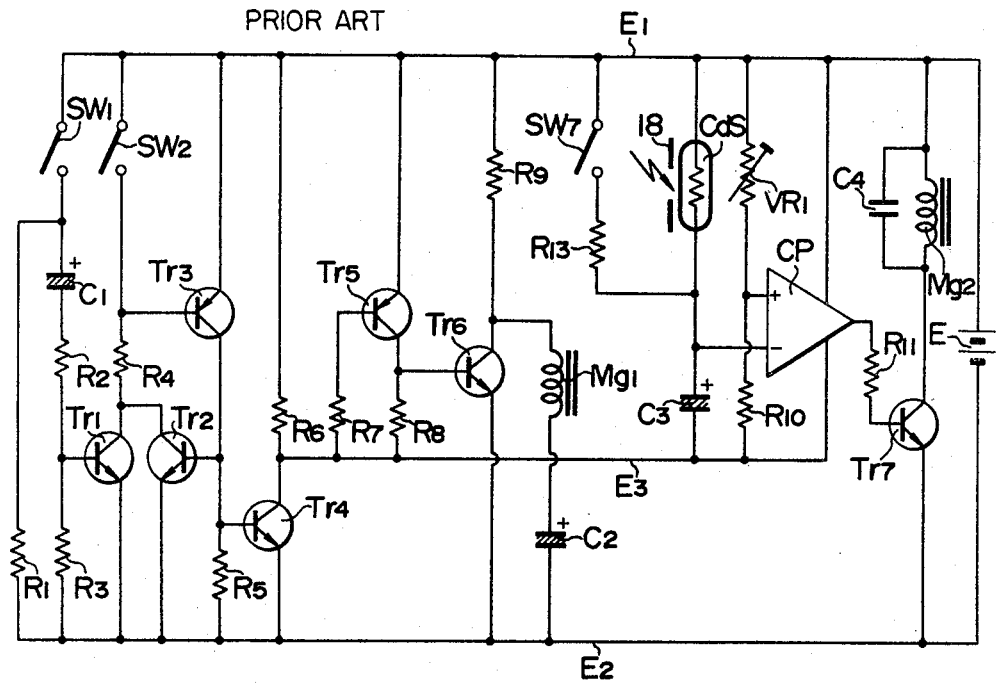
FIG. 5 is a circuit diagram of a conventional electrical shutter circuit which may be used in a camera of an automatic exposure control type.
Figure 6:
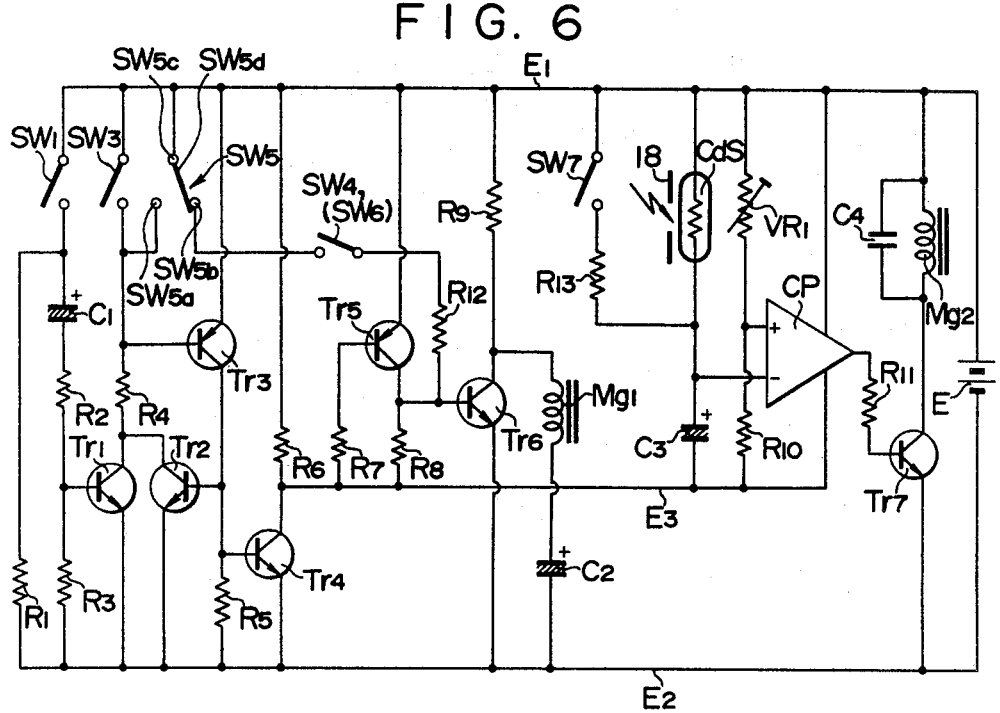
FIG. 6 is a circuit diagram of an electrical shutter circuit for a camera of an automatic exposure control type which is constructed in accordance with one embodiment of the invention.

When front cover 4 is moved to its open position, switch SW3 associated therewith is opened, permitting a usual photographing operation with an automatic exposure control as in the example shown in FIG. 5.

In the embodiment described above, three switches SW3, SW4 and SW5 which are mechanically associated with the front cover, rear lid 16 and the film winding mechanism, respectively, are provided in combination to disable a shutter release operation when front cover 4 is in its closed position to disable a photographing operation and to permit a high speed shutter operation automatically in response to the completion of a film winding operation whenever rear lid 16 is opened if the front cover is in its closed position in order to enable a film loading operation. In an alternative arrangement, switch SW4 which is mechanically associated with rear lid 16 may be replaced by a switch which is associated with film frame counter 13.

Figure 2:
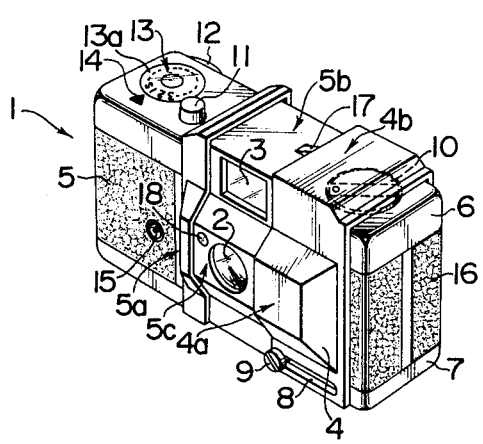
FIG. 2 is a perspective view of the camera shown in FIG. 1, with the front cover being in its open position.
Figure 3:
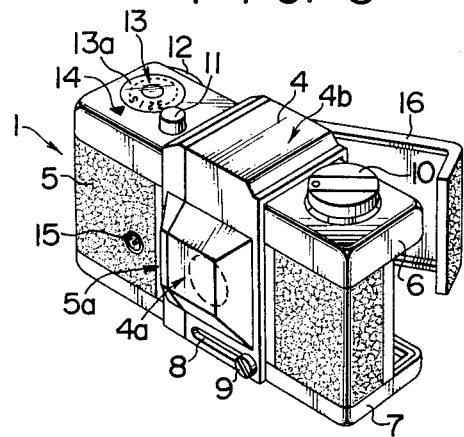
FIG. 3 is a perspective view of the camera shown in FIG. 1, with its rear lid being opened.
Figure 4:
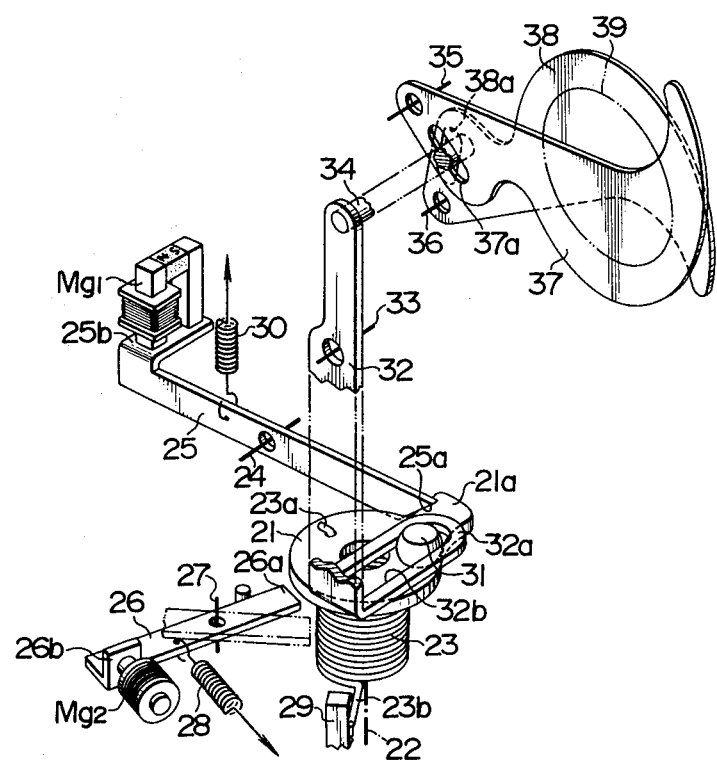
FIG. 4 is a perspective view of a shutter mechanism of an electromagnet release type which is assembled into the camera of FIG. 1.

As is well recognized, the purpose of film frame counter 13 is to indicate the number of film frames which have been used to take pictures. As shown in FIGS. 1 to 3, it is disposed on top plate 6 of the camera on the left-hand side thereof, and is automatically reset to align a start mark "S" with index 14 as rear lid 16 is opened. When a film is loaded into a film chamber of the camera, a leader portion of the film is disposed around a spool, and after closing rear lid 16, an idle shutter operation is repeated twice or thrice to wind up the film, thus operating counter 13 so that a count "1" is aligned with index 14.

Figure 7:
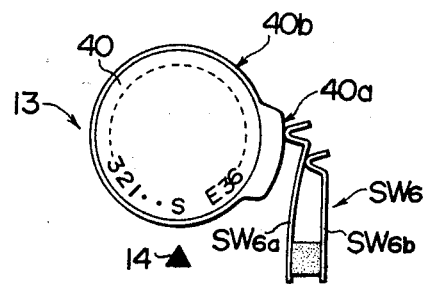
FIG. 7 is a plan view of a switch associated with a film frame counter and which is used in the electrical shutter circuit of FIG. 6.
Figure 8:
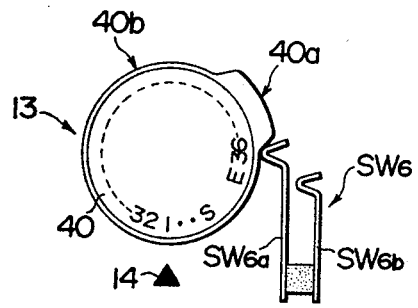
FIG. 8 is a plan view of the switch shown in FIG. 7, illustrating a different operative position.

As shown in FIGS. 7 and 8, counter 13 includes dial 40 in the form of a disc which is peripherally provided with a projection so that the outer peripheral surface of the disc provides a cam surface including convex surface 40a and recessed surface 40b. In an embodiment using a film frame counter, switch SW6 which is mechanically associated with the counter is disposed for abutment against the cam surface. Switch SW6 includes blade-shaped, movable contact SW6a and blade-shaped movable contact SW6b which is disposed in parallel relationship with movable contact SW6a and separated therefrom with an insulating material, both formed of a resilient material. When contact SW6a bears against convex surface 40a of the cam surface (see FIG. 7), both contacts are in mechanical and electrical engagement with each other, while they remain separated from each other when contact SW6a bears against recessed surface 40b (see FIG. 8).

Describing the use of switch SW6, when front cover 4 is moved to its closed position and rear lid 16 opened in order to load a film, dial 40 of counter 13 is automatically reset to a position in which start mark "S" therein is aligned with index 14, whereby switch SW6 is closed. This switch SW6 may be substituted for switch SW4 shown in FIG. 6. When switch SW3 is closed as is switch SW6, switch SW5 can be switched to the terminal SW5b if a film winding operation has been completed, thus activating the shutter at its maximum speed. If a film winding operation is not completed, a shutter operation at its maximum speed can be initiated upon completion of a film winding operation.

When a film winding operation is repeated to activate the shutter twice or thrice until counter 13 presents a count of "1", contact SW6a moves down convex surface 40a onto recessed surface 40b, whereby contacts SW6a, SW6b become separated from each other to open switch SW6. Hence, the depression of release button 11 cannot initiate a shutter release when front cover 4 is in its closed position in the same manner as the embodiment shown in FIG. 6. Subsequently when front cover 4 is moved to its open position to enable a photographing operation, a picture can be taken with an automatic exposure control in the same manner as described above in connection with FIG. 6.

Figure 9:
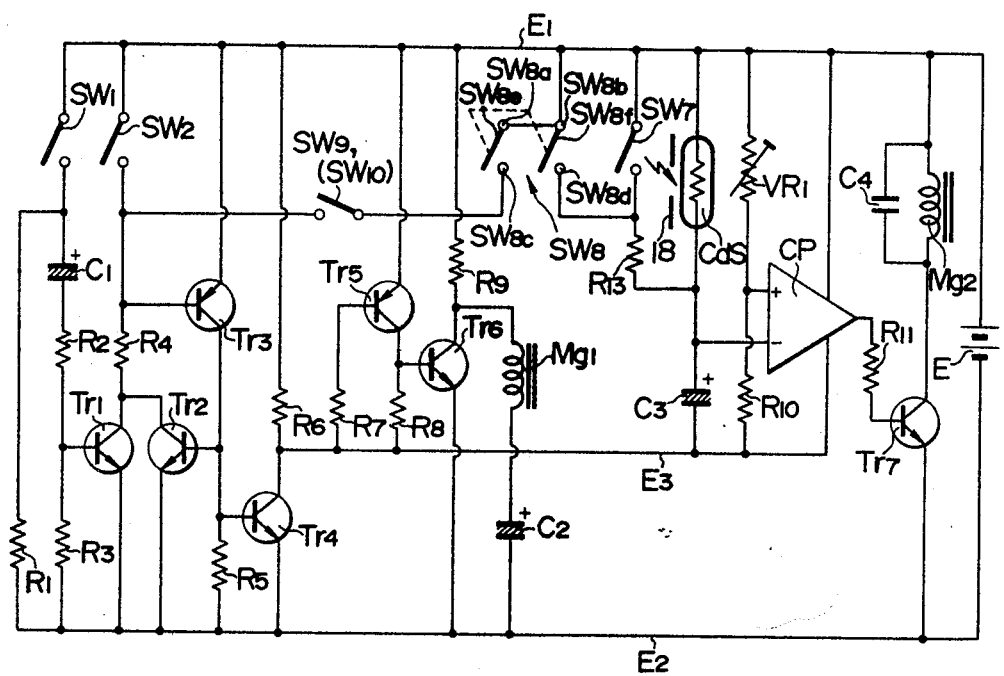
FIG. 9 is a circuit diagram of an electrical shutter circuit according to another embodiment of the invention.

FIG. 9 shows a further embodiment of the invention which includes switches SW8 and SW9 which are mechanically associated with front cover 4 and rear lid 16, respectively. As will be further described later, when front cover 4 is in its closed position and rear lid 16 is closed, a shutter release is disabled while a shutter release is enabled during a film loading condition when front cover 4 is in its closed position, but rear lid 16 is opened. Obviously, a shutter release can be effected during a condition when front cover 4 is in its open position and rear lid 16 is closed.

In the electrical shutter circuit of FIG. 9, switch SW8 which is mechanically associated with front cover 4 includes one fixed terminal SW8d which is connected with the junction between flash photography switch SW7 and resistor R13. Switch SW8 comprises a ganged switch having a pair of mechanically coupled movable contacts SW8e, SW8f, connected with terminals SW8a and SW8b, respectively, which are connected together and connected with bus E1. Switch SW8 also includes another fixed terminal SW8c which is connected with the junction between disconnection switch SW2 and resistor R4 through switch SW9 which is mechanically associated with rear lid 16. Switches SW8 and SW9 are both turned on when front cover 4 and rear lid 16 are closed, and turned off when the latter are opened.

When front cover 4 is closed, movable contacts SW8e, SW8f are thrown to fixed terminals SW8c, SW8d, respectively. The engagement of movable contact SW8f with fixed terminal SW8d connects one end of resistor R13 with bus E1. The engagement of movable contact SW8e with fixed terminal SW8c connects one end of switch SW9 with bus E1. At the time front cover 4 is in its closed position, rear lid 16 assumes its closed position, so that switch SW9 remains closed, disabling a shutter release operation. Specifically, both of these switches act to connect the base of transistor Tr3 with bus E1 in the same manner as disconnection switch SW2 does when it is closed. Hence, if a film winding operation is completed to charge the shutter and release button 11 is depressed at this time, transistor Tr3 remains off and bus E3 is not fed. Consequently, both electromagnets Mg1 and Mg2 cannot be energized, preventing a shutter operation. In other words, a shutter release is disabled when both front cover 4 and rear lid 16 are simultaneously closed.

Subsequently, when rewind knob 10 is pulled up to open rear lid 16, switch SW9 which is associated therewith is opened. Then, the connection of the base of transistor Tr3 with bus E1 is interrupted, so that the depression of release button 11 closes release switch SW1 to turn transistor Tr3 on in the same manner as it occurs during normal photographing operation, thus energizing electromagnet Mg1 to effect a shutter release. Since switch SW8 is previously closed, the photometric control circuit operates with a time constant circuit comprising light receiving element CdS, resistor R13 and capacitor C3 to close the shutter in a reduced length of time which is determined by such circuit in the same manner as during a flash photography. However, it is to be noted that since front cover 4 is now closed, window 18 associated with element CdS is shielded from the incidence of external light, so that the shutter will operate with an exposure period which corresponds to a flash photography in darkness. This shutter operation enables a film winding, which thus accomplishes a winding of a leader portion of the film.

Figure 10:
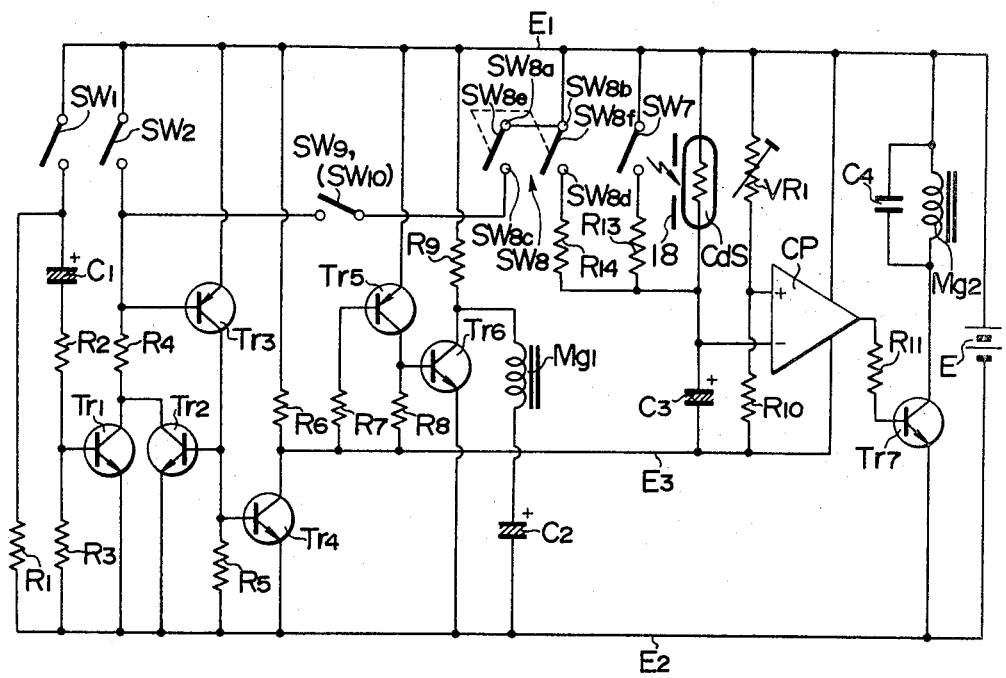
FIGS. 10 to 12 are circuit diagrams of electrical shutter circuits according to other embodiments of the invention.

FIG. 10 shows a modification of the electrical shutter circuit of the invention. In this instance, fixed terminal SW8d of the switch SW8 shown in FIG. 9 is connected with the junction between light receiving element CdS and timing capacitor C3 through resistor R14 rather than being connected with the junction between switch SW7 and resistor R13. In other respects, the arrangement is quite similar to the arrangement shown in FIG. 9, and hence similar parts are designated by like reference characters will not be specifically described.

In this instance, an exposure period for a shutter operation during a film loading operation when front cover 4 is moved to its closed position and rear lid is opened is determined by a time constant circuit comprising resistor R14, light receiving element CdS and capacitor C3, and it will be noted that this exposure period has a specified, reduced length which is independent from an exposure period during a flash photography. Other operating features are similar to those described in connection with FIG. 9.

Figure 11:
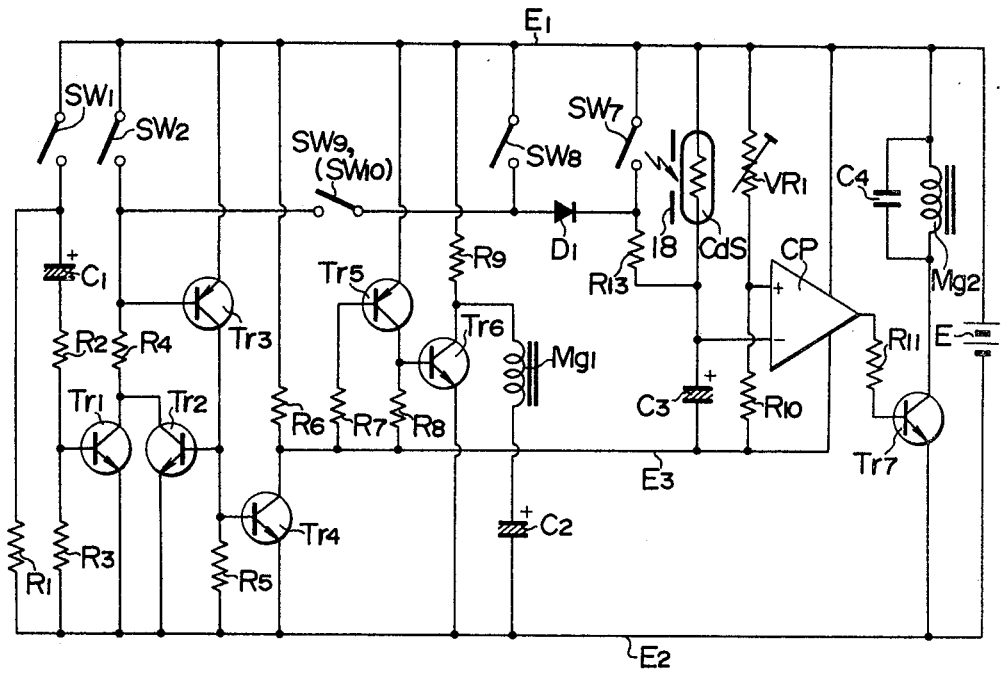

FIG. 11 shows another modification of the electrical shutter circuit. In this instance, switch SW8 which is mechanically associated with the front cover comprises a single pole switch rather than being formed as a ganged switch. In addition, diode D1 is interposed between the fixed terminal of switch SW8 and the junction between switch SW7 and resistor R13, with the anode of diode connected with switch SW8. In other respects, the arrangement is identical to the embodiment shown in FIG. 9 and hence will not be specifically described.

This arrangement again achieves the same functioning and effect as described above in connection with FIG. 9. Specifically, when switch SW8 is closed, bus E1 is connected with switch SW9 as well as the junction between switch SW7 and resistor R13. Such connection is interrupted when switch SW8 is opened.

Figure 12:
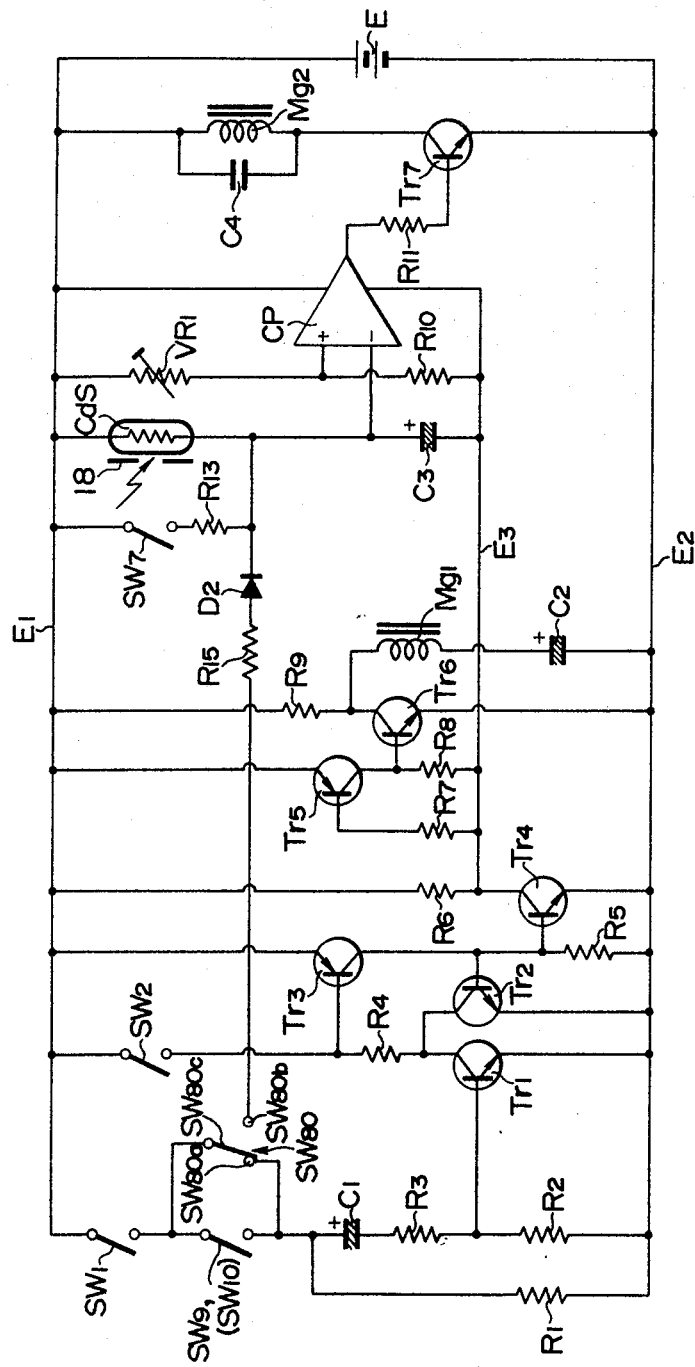

FIG. 12 shows a further modification of the electrical shutter circuit of the invention. In this instance, a parallel combination of switch SW9 mechanically associated with the rear lid and switch SW80 mechanically associated with the front cover is connected between release switch SW1 and capacitor C1. In contradistinction to the embodiment shown in FIG. 9, switch SW9 is turned off and on when rear lid 16 is closed and opened, respectively. Switch SW80 comprises a transfer switch which can be switched between a pair of fixed terminals SW80a, SW80b. Terminal SW80a is connected with the junction between switch SW9 and capacitor C1 while the other terminal SW80b is connected with the junction between light receiving element CdS and capacitor C3 through a series combination of resistor R15 and diode D2. Switch SW80 includes movable contact SW80c which engages fixed terminal SW80a when front cover 4 is moved to its open position, and which engages fixed terminal SW80b when front cover 4 is moved to its closed position. In other respects, the arrangement is similar to that shown in FIG. 9, and hence corresponding parts are designated by like reference characters without repeating their description.

This arrangement achieves the same functioning and effect as those achieved by the embodiment of FIG. 9. Specifically, in the embodiment shown in FIGS. 9 to 11, the combination of switches SW8 and SW9 which are mechanically associated with the front cover and the rear lid, respectively, achieved a connection of the base of disconnection transistor Tr3 with bus E1. By contrast, in the present arrangement, the combination of switches SW9 and SW80 determines whether release switch SW1 is connected with the base of starting transistor Tr1.

With the present embodiment, when a picture is to be taken in a normal manner, rear lid 16 is closed while front cover 4 is in its open position, so that switch SW9 is open and movable contact SW80c of switch SW80 is engaged with fixed terminal SW80a. Hence, the depression of release button 11 to close release switch SW1 allows a usual photographing operation to be effected.

When a film is to be loaded, front cover 4 is in its closed position while rear lid 16 is opened. Thus switch SW9 is closed while movable contact SW80c is engaged with fixed terminal SW80b. The depression of release button 11 to close release switch SW1 is effective to connect resistor R15 into the photometric control circuit, whereby the shutter operates with a specified exposure period having a reduced length which is determined by a time constant circuit including resistor R15, element CdS and capacitor C3.

When both front cover 4 and rear lid 16 are closed to disable a shutter release, switch SW9 is open while movable contact SW80c engages fixed terminal SW80b. Hence, release switch SW1 remains without circuit connection, so that the depression of release button 11 has no effect whatsoever, thus preventing a shutter release.

In the embodiments shown in FIGS. 9 to 12, switch SW9 associated with rear lid 16 is used in combination with switch SW8 or SW80 which is mechanically associated with front cover 4 to disable a shutter release operation when front cover 4 is in its closed position and to enable a shutter release for purpose of film loading whenever the rear lid is opened if front cover is in its closed position. However, it should be understood that switch SW9 may be replaced by a switch as illustrated in FIGS. 7 and 8 which is mechanically associated with a film frame counter.

Figure 13:
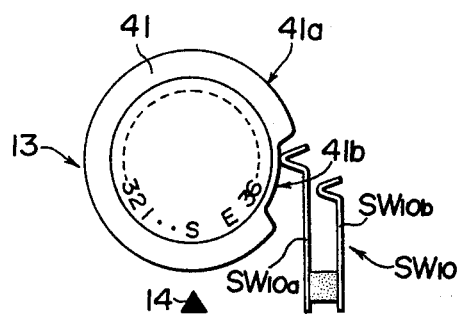
FIG. 13 is a plan view of a switch associated with a film frame counter which may be used in the electrical shutter circuit shown in FIGS. 9 to 11.
Figure 14:
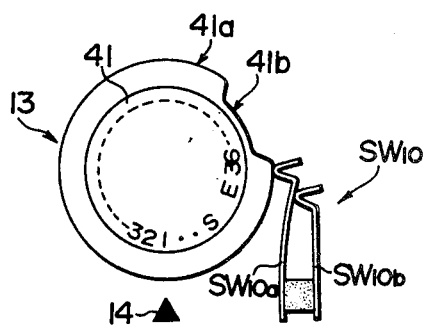
FIG. 14 is a plan view of the switch shown in FIG. 13, illustrating a different operative position.
Figure 15:
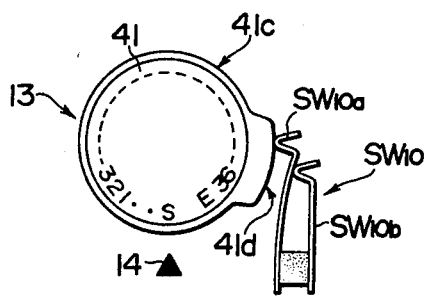
FIG. 15 is a plan view of a switch associated with a film frame counter which may be used in the electrical shutter circuit shown in FIG. 12.

FIGS. 13 to 15 show modified film frame counter 13' having dial 41 in the form of a disc. Part of dial 41 is peripherally notched to present a cam surface comprising raised surface 41a and recessed surface 41b. Switch SW10 is disposed for abutment against the cam surface, and includes a pair of blade-shaped movable contacts SW10a, SW10b disposed in opposing relationship and electrically insulated from each other by an insulating block. Both contacts are formed of a resilient material, and movable contact SW10a is disposed for abutment against the cam surface. When contact SW10a bears against recessed surface 41b of the cam surface (see FIG. 13), both contacts are separated from each other, but they engage each other when contact SW10a bears against raised surface 41a (see FIG. 14).

In use, when front cover 4 is moved to its closed position and rear lid 16 is opened in order to load a film, dial 41 of counter 13 is automatically reset to a position in which start mark "S" is aligned with index 14, thus opening switch SW10. When switch SW10 is substituted for switch SW9 shown in FIG. 9, the closure of switch SW8 and the opening of switch SW10 enable a shutter operation with an exposure period corresponding to that of the flash photography in response to the depression of shutter button 11 to close release switch SW1, generally in the same manner as described above in connection with FIG. 9. Hence, winding knob 12 may be used to load the film.

When a shutter operation is repeated twice or thrice to complete a film loading operation until frame counter 13 presents a count of "1", contact SW10a bears against raised surface 41a so that both contacts SW10a, SW10b engage each other to close switch SW10. Hence, the depression of release button 11 cannot achieve a shutter release operation, in the same manner as in the embodiment of FIG. 9. Subsequently, when front cover 4 is moved to its open position to enable a photographing operation, a photographing operation with an automatic exposure control or a flash photography is enabled, again in the same manner as in FIG. 9.

In this manner, it will be understood that the substitution of switch SW10, which is mechanically associated with a film frame counter, for switch SW9 which is mechanically associated with rear lid and which is shown in the embodiments shown in FIGS. 10 to 12 also forms different embodiments of the invention. However, it should be noted that when switch SW10 is substituted for switch SW9 shown in FIG. 12, switch SW10 is opened and closed in the opposite manner from the operation of the same switch when used in the embodiments shown in FIGS. 9 to 11, and hence different counter 13" (FIG. 15) should be used having raised and recessed surfaces which are interchanged from those shown in FIGS. 13 and 14.

What is claimed is:

1. A photographic camera of an automatic exposure control type, said camera comprising a camera body, a taking lens disposed on said camera body, a rear lid disposed on said camera body, a film winding mechanism disposed in said camera body, an electrical shutter of the electromagnetic release type including an electrical shutter circuit, a front cover slidably disposed across the front surface of said camera body between a first position in which it closes said taking lens and a second position in which it exposes the taking lens; a first switch which is turned on and off in accordance with the position of the front cover, a second switch which is turned on and off as said rear lid of the camera is opened or closed, a third switch which is changed over in accordance with the operation of said film winding mechanism and the operation of said electrical shutter, and means for coupling said switches to said electrical shutter circuit for providing that a shutter release operation is disabled when the front cover is in its first position to disable a photographing operation but for enabling a high speed shutter operation in response to completion of the film winding operation whenever the rear lid of the camera is opened and the front cover is in the first position.

2. A photographic camera according to claim 1, further comprising a shutter release electromagnet, a drive circuit for said shutter release electromagnet, said second switch being connected between the third switch and said drive circuit, said second switch being closed and opened as the rear lid of the camera is opened and closed, respectively.

3. A photographic camera according to claim 1, further comprising a shutter release electromagnet, a drive circuit for said shutter release electromagnet, said electrical shutter circuit including transistor means, said third switch comprises a changeover switch having a pair of fixed terminals, one of which is connected with said drive circuit through the second switch and the other of which is connected with said transistor means in the electrical shutter circuit which maintains the connection of the electrical shutter circuit with a power supply, said third switch also including a movable contact which is thrown to said one fixed terminal in response to the completion of the film winding operation to activate the drive circuit for shutter release in response to the closure of the second switch, the movable contact being thrown to the other fixed terminal as said electrical shutter has completed its running, thereby maintaining the transistor non-conductive.

4. A photographic camera of an automatic exposure control type, said camera comprising a camera body, a taking lens disposed on said camera body, a film winding mechanism disposed in said camera body, a film frame counter disposed in said camera body, an electrical shutter of the electromagnetic release type including an electrical shutter circuit, a front cover slidably disposed across the front surface of said camera body between a first position in which it closes said taking lens and a second position in which it exposes the taking lens; a first switch which is turned on and off in accordance with the position of the front cover, a second switch which is turned on and off in accordance with the count of said film frame counter, a third switch which is changed over in accordance with the operation of said film winding mechanism and the operation of said electrical shutter, and means for coupling said switches to said electrical shutter circuit for providing that a shutter release operation is disabled when the front cover is in its first position to disable a photographing operation but for enabling a high speed shutter operation in response to completion of a film winding operation in the first position of the front cover until a count of "1" is set in the film frame counter.

5. A photographic camera according to claim 4, further comprising a shutter release electromagnet, transistor means for operating said shutter release electromagnet, said second switch being connected between the third switch and said transistor means, the second switch remaining closed until the film frame counter presents a count of "1" and being opened after such count.

6. A photographic camera according to claim 4, further comprising a shutter release electromagnet, a drive circuit for said shutter release electromagnet, said electrical shutter circuit including transistor means, said third switch comprises a changeover switch having a pair of fixed terminals, one of which is connected with said drive circuit through the second switch, and the other of which is connected with said transistor means in the electrical shutter circuit which maintains the connection of the electrical shutter circuit with a power supply, said third switch also including a movable contact which is thrown to said one fixed terminal upon completion of a film winding operation to activate the drive circuit for shutter release in response to the closure of the second switch, the movable contact being thrown to the other fixed terminal as said electrical shutter has completed its running, thereby maintaining the transistor non-conductive.

7. A photographic camera according to claim 1 or 4 in which the said electrical shutter circuit includes transistor means coupled to said first switch which maintains the connection of the electrical shutter circuit with a power supply, the first switch maintaining said transistor means non-conductive in the first position of the front cover.

8. A photographic camera according to claim 1 or 4, further comprising a shutter release and controlling electromagnet, a drive circuit for said shutter release electromagnet, transistor means, the first position of the front cover causing a shutter operation to take place at its maximum speed by activating said drive circuit to cause said electrical shutter to release and by turning said transistor means off to prevent an energization of said shutter controlling electromagnet.

9. A photographic camera of an automatic exposure control type said camera comprising a camera body, a taking lens disposed on said camera body, a rear lid disposed on said camera body, an electrical shutter of the electromagnetic release type including an electrical shutter circuit, a front cover slidably disposed across the front surface of said camera body between a first position in which it closes said taking lens and a second position in which it exposes the taking lens, a first switch which is turned on and off in accordance with the position of the front cover, a second switch which is turned on and off as said rear lid of the camera is opened and closed, respectively, and means for coupling said switches to said electrical shutter circuit for providing that a shutter release operation is disabled in the first position of the front cover but for enabling a shutter release operation in the first position of the front cover as the rear lid of the camera is opened.

10. A photographic camera according to claim 9, said electrical shutter circuit comprising an exposure period determining circuit having a timing resistor and transistor means, the first switch comprises a ganged switch having a pair of interconnected movable contacts and having a pair of fixed terminals, one of which is connected through the second switch with said transistor means in the electrical shutter circuit which maintains the connection of the electrical shutter circuit with a power supply and the other of which is connected with said timing resistor in said exposure period determining circuit, the exposure period determining circuit being enabled to operate in the first position of the front cover, the closure of the second switch maintaining said transistor means non-conductive.

11. A photographic camera according to claim 9, said electrical shutter circuit comprising an exposure period determining circuit having a timing resistor and transistor means, the first switch includes a fixed terminal which is connected through the second switch with said transistor means in the electrical shutter circuit which maintains the connection of the electrical shutter circuit with a power supply, and said fixed terminal being connected through a diode with said timing resistor in said exposure period determining circuit, the exposure period determining circuit being enabled to operate in the first position of the front cover, said transistor means being maintained non-conductive in the first position of the front cover whenever the second switch is closed.

12. A photographic camera according to claim 10 or 11 in which the second switch is connected between the first switch and said transistor, and is opened and closed as the rear lid is opened and closed, respectively.

13. A photographic camera according to claim 9, said electrical shutter circuit comprising a capacitor, a release switch, an exposure period determining circuit having a timing resistor, and transistor means, the first switch comprises a change over switch having a movable contact which is connected to said release switch and also having a pair of fixed terminals, one of which is connected to said capacitor which produces a differentiated pulse which starts the operation of the electrical shutter circuit and the other of which is connected with said timing resistor in said exposure period determining circuit, the exposure determining circuit being enabled to operate in the first position of the front cover, said transistor means being maintained non-conductive in response to the closure of the second switch.

14. A photographic camera according to claim 13 in which the second switch is connected in shunt with the first switch and connected between the release switch and the capacitor which produces a differentiated pulse for starting the operation of the electrical shutter circuit, the second switch being closed and opened when the rear lid is opened and closed, respectively.

15. A photographic camera of an automatic exposure control type said camera comprising a camera body, a taking lens disposed on said camera body, a film frame counter disposed on said camera body, an electrical shutter of the electromagnetic release type including an electrical shutter circuit, a front cover slidably disposed across the front surface of said camera body between a first position in which it closes said taking lens and a second position in which it exposes the taking lens; a first switch which is turned on and off in accordance with the position of the front cover, a second switch which is turned on and off in accordance with the operation of said film frame counter, and means for coupling said switches to said electrical shutter circuit for providing that a shutter release operation is disabled in the first position of the front cover and is enabled by the second switch in the first position of the front cover until the film frame counter presents a count of "1".

16. A photographic camera according to claim 15, said electrical shutter circuit comprising an exposure period determining circuit having a timing resistor and transistor means, the first switch comprises a ganged switch having a pair of interconnected movable contacts and having a pair of fixed terminals, one of which is connected through the second switch with said transistor means in the electrical shutter circuit which maintains the connection of the electrical shutter circuit with a power supply and the the other of which is connected with said timing resistor in said exposure period determining circuit, the exposure period determining circuit being enabled to operate in the first position of the front cover, said transistor means being maintained non-conductive in the first position of the front cover whenever the second switch is closed.

17. A photographic camera according to claim 15, said electrical shutter circuit comprising an exposure period determining circuit having a timing resistor and transistor means, the first switch includes a fixed terminal which is connected through the second switch with said transistor means in the electrical shutter circuit which maintains the connection of the electrical shutter circuit with a power supply, and said fixed terminal being connected through a diode with said timing resistor in said exposure period determining circuit, the exposure period determining circuit being enabled to operate in the first position of the front cover, said transistor means being maintained non-conductive in the first position of the front cover whenever the second switch is closed.

18. A photographic camera according to claim 16 or 17 in which the second switch is connected between the first switch and said transistor means and remains open until the film frame counter presents a count of "1", the second switch remaining closed thereafter.

19. A photographic camera according to claim 15, said electrical shutter circuit comprising a capacitor, a release switch, an exposure period determining circuit having a timing resistor, and transistor means, the first switch comprises a change over switch having a movable contact connected with said release switch and a pair of fixed terminals, one of which is connected with said capacitor which produces a differentiated pulse for starting the operation of the electrical shutter circuit and the other of which is connected with said timing resistor in said exposure period determining circuit, the exposure period determining circuit being enabled to operate in the first position of the front cover, said transistor means being maintained non-conductive in response to the closure of the second switch.

20. A photographic camera according to claim 19 in which the second switch is connected in shunt with the first switch and connected between the release switch and the capacitor which produces a differentiated pulse for starting the operation of the electrical shutter circuit, the second switch remaining closed until the film frame counter presents a count of "1" and remaining open thereafter.

21. A photographic camera according to one of claims 10 to 17, 13 or 14 in which the timing resistor has a value to provide an exposure period suitable for a flash photography, whereby a shutter operation in the first position the front cover takes place with an exposure period corresponding to a flash photography.

22. A photographic camera according to one of claims 10 to 17, 13 or 19, further comprising a timing capacitor and in which the timing resistor is connected with said timing capacitor to provide a specified exposure period with which a shutter operation in the first position of the front cover takes place.

* * * * *

UNITED STATES PATENT AND TRADEMARK OFFICE
CERTIFICATE OF CORRECTION

PATENT NO. : 4,272,168
DATED : June 9, 1981
INVENTOR(S) : Yoshihisa Maitani and Katsuhiko Tsunefuji It is certified that error appears in the above—identified patent and that said Letters Patent is hereby corrected as shown below:

Column 2, line 12, change "fixedly 23b" to --23b fixedly--.

Column 3, line 48, change "connection" to --connected--.

Column 10, line 34, change "therein" to --thereon--.

Column 18, line 33, change "14" to --19--.

Column 18, line 36, after "position" insert --of--.

Signed and Sealed this

Twenty-fifth Day of August 1981

[SEAL]

Attest:

Attesting Officer

GERALD J. MOSSINGHOFF

Commissioner of Patents and Trademarks